United States Patent
Ahuja

(10) Patent No.: US 11,134,083 B2
(45) Date of Patent: Sep. 28, 2021

(54) USER AUTHORIZATION AND AUTHENTICATION ACCESSING MICROSERVICES ACROSS SPACES

(71) Applicant: SAP SE, Walldorf (DE)

(72) Inventor: Sapreen Ahuja, Bangalore (IN)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 16/741,981

(22) Filed: Jan. 14, 2020

(65) Prior Publication Data

US 2021/0218743 A1    Jul. 15, 2021

(51) Int. Cl.
*H04L 29/06* (2006.01)
*H04L 29/08* (2006.01)

(52) U.S. Cl.
CPC ...... *H04L 63/0892* (2013.01); *H04L 63/0815* (2013.01); *H04L 63/102* (2013.01); *H04L 67/2814* (2013.01); *H04L 67/2838* (2013.01); *H04L 67/40* (2013.01)

(58) Field of Classification Search
CPC . H04L 63/0892; H04L 67/26; H04L 61/1541; G01S 5/0027
USPC .......................................................... 726/4
See application file for complete search history.

(56) References Cited

U.S. PATENT DOCUMENTS 7,735,100 B1 *   6/2010  Sallam .................... H04L 63/10
                                                       719/330
10,904,038 B1 *  1/2021  Haque .................... H04L 12/66

2012/0176638 A1 * 7/2012 Wakana ............. H04N 1/00127
                                                       358/1.13
2013/0238557 A1 * 9/2013 Mandelstein ......... G06F 16/211
                                                       707/635
2014/0189682 A1 * 7/2014 Crudele ................ G06F 3/0605
                                                       718/1
(Continued)

FOREIGN PATENT DOCUMENTS

EP              3452944 A1 *  3/2019    ........... G06F 16/951

OTHER PUBLICATIONS

Chawla et al., "Building Microservices Applications on Microsoft Azure", 2019 (Year: 2019).*

(Continued)

*Primary Examiner* — Ondrej C Vostal
(74) *Attorney, Agent, or Firm* — Buckley, Maschoff & Talwalkar LLC

(57) ABSTRACT

A cloud computing environment may have a landscape space for singleton applications including a SAAS UAA component to receive a subscription request associated with a user and a platform SAAS application. A user system registry may indicate spaces in which the user is registered, a route proxy agent may route communications via a first secure communication channel in accordance with information in the user system registry, and a route service broker may handle binding requests. The environment may also include a first system space for first system microservices with a first system onboarding application that receives provisioning application information via the route proxy agent and the secure communication channel. First backend microservices may similarly receive application router information, and a first route service shared instance clone may provide binding requests to the route service broker. A second system space for second system microservices may similarly be provided.

22 Claims, 11 Drawing Sheets

(56) References Cited

U.S. PATENT DOCUMENTS

| | | | | |
|---|---|---|---|---|
| 2016/0036983 | A1* | 2/2016 | Korolev | H04M 3/5233 |
| | | | | 379/265.12 |
| 2016/0337456 | A1* | 11/2016 | Pathak | H04L 61/1541 |
| 2017/0343360 | A1* | 11/2017 | Harikrishnan | G01S 5/0027 |
| 2018/0083977 | A1* | 3/2018 | Murugesan | G06F 16/27 |
| 2018/0131583 | A1* | 5/2018 | Barrows | H04L 67/306 |
| 2018/0146056 | A1* | 5/2018 | Eberlein | H04L 67/2809 |
| 2018/0152534 | A1* | 5/2018 | Kristiansson | H04L 67/1002 |
| 2018/0176176 | A1* | 6/2018 | Kapur | H04L 67/10 |
| 2018/0316772 | A1* | 11/2018 | Eberlein | H04L 67/16 |
| 2019/0114210 | A1* | 4/2019 | Han | G06F 9/5077 |
| 2019/0268338 | A1* | 8/2019 | Patil | H04W 4/70 |
| 2019/0342284 | A1* | 11/2019 | Vohra | H04L 63/108 |
| 2020/0076817 | A1* | 3/2020 | Gupta | G06F 21/41 |
| 2020/0120098 | A1* | 4/2020 | Berg | H04L 63/101 |
| 2020/0133545 | A1* | 4/2020 | Alkalay | G06F 12/0246 |
| 2020/0169562 | A1* | 5/2020 | Moldoveanu | H04L 67/26 |
| 2020/0296172 | A1* | 9/2020 | Gunjal | G06N 3/08 |
| 2020/0358876 | A1* | 11/2020 | Kulkarni | G06F 9/5072 |
| 2020/0403875 | A1* | 12/2020 | Rooney | H04W 12/08 |
| 2020/0412770 | A1* | 12/2020 | Zhang | H04L 65/104 |
| 2021/0099339 | A1* | 4/2021 | Behm | H04W 4/70 |
| 2021/0133086 | A1* | 5/2021 | Joyce | G06F 11/3684 |
| 2021/0136095 | A1* | 5/2021 | Dinh | H04L 63/1458 |

OTHER PUBLICATIONS

Google, "what is onboarding application?", 2021 (Year: 2021).*
Microsoft Computer Dictionary, "on-board computer", 5th edition, 2002 (Year: 2002).*

* cited by examiner

USER AUTHORIZATION AND AUTHENTICATION ACCESSING MICROSERVICES ACROSS SPACES

BACKGROUND

In many cases, an enterprise may want to utilize a cloud computing environment (which might comprise multiple landscapes and/or spaces) to execute applications. For example, a business might execute applications made up of microservices via the cloud to track purchase orders, track sales and financial results, manage a human resources department, etc. In some cases, multiple versions of an application might be available (a test version, a production version, etc.) and different users associated with the enterprise might need to access different applications and/or versions of the applications at different times. Managing such access (including the authorization and/or authentication of each user) in a cloud computing environment, however, can be a difficult task—especially when there are a substantial number of users, applications, etc.

It would therefore be desirable to provide user authorization and authentication access for microservices across spaces in an efficient and accurate way.

SUMMARY

Methods and systems may be associated with a cloud computing environment that has a landscape space for singleton applications including a SAAS UAA component to receive a subscription request associated with a user and a platform SAAS application. A user system registry may indicate spaces in which the user is registered, a route proxy agent may route communications via a first secure communication channel in accordance with information in the user system registry, and a route service broker may handle binding requests. The environment may also include a first system space for first system microservices with a first system onboarding application that receives provisioning application information via the route proxy agent and the secure communication channel. First backend microservices may similarly receive application router information, and a first route service shared instance clone may provide binding requests to the route service broker. A second system space for second system microservices may similarly be provided.

Some embodiments comprise: means for receiving, at a Software As a Service ("SAAS") User Authorization and Authentication ("UAA") component of a landscape space for singleton applications, a subscription request associated with a user and a platform SAAS application; means for routing, by a route proxy agent of the landscape space for singleton applications, communications via a first secure communication channel in accordance with information in a user system registry, wherein the user system registry indicates spaces in which the user is registered; means for handling, by a route service broker of the landscape space for singleton applications, binding requests; means for receiving, at a first system onboarding application of a first system space for first system microservices, provisioning application information from the user via the route proxy agent and the first secure communication channel; means for receiving, at first backend microservices of the first system space for first system microservices, application router information from the user via the route proxy agent and the first secure communication channel; and means for providing, from a first route service shared instance clone of the first system space for first system microservices, binding requests of the first system onboarding application and the first backend microservices to the route service broker.

Some technical advantages of some embodiments disclosed herein are improved systems and methods to provide UAA access for microservices across spaces in an efficient and accurate way.

DETAILED DESCRIPTION

Figure 1:
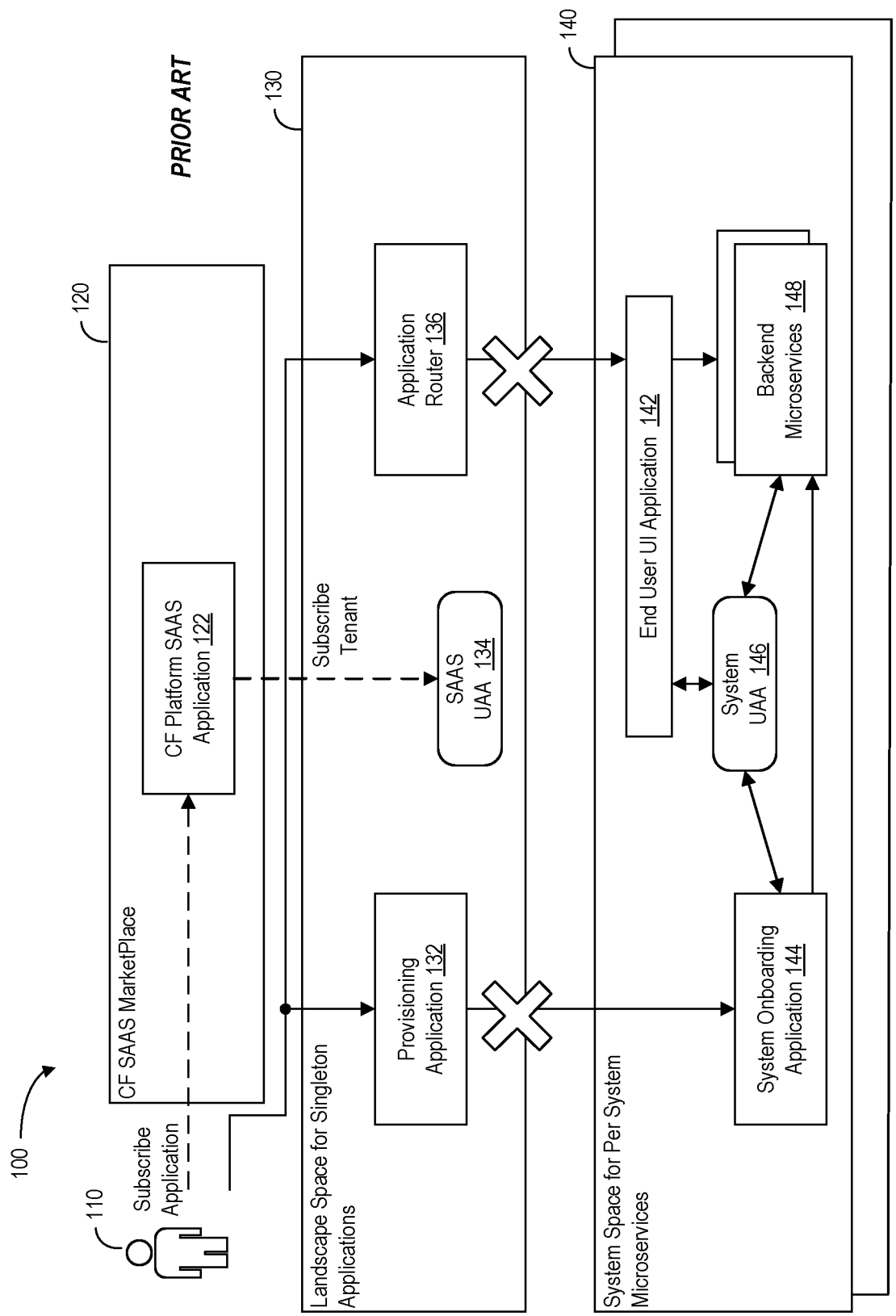
FIG. 1 is a high-level block diagram of a cloud computing environment architecture layout.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments use cloud computing constructs, such as those associated with the Cloud Foundry ("CF") open source, multi-cloud application platform as a service, to allow for User Authorization and Authentication ("UAA") to access microservices (including multi-tenant microservice) across spaces while using a single managed UAA server. As used herein the phrase "UAA" may refer to an open source CF identity server that provides enterprise-scale identity management features.

Moreover, the term "landscape" may refer to a data center with one or more availability zones that hosts at least one CF installation as a Platform As A Service ("PAAS"). If multiple CF PAAS offerings are offered by one data center, then each would qualify as a separate landscape. The phrase "system scoped software" may refer to a complete installation of all microservices that together constitute a single consumable service or software offering. This may (or may not) comprise multi-tenant or tenant specific microservices or applications or platform service offerings. The phrase "landscape scoped software" may refer to a complete installation of all microservices that are a singleton on a landscape (and may be used to manage all system scoped software entities.

The phrase "provider account" may refer to a user or resource account which logically allows access and contains the system scoped and landscape scoped software entities. The phrase "subscriber account" may refer to a user or resource account that logically is owned by a tenant or customer. The subscriber account allows the tenant to add multiple users to his or her account and also allows the assignment of specific roles, scopes, and/or access rights to users.

Note that in a single landscape, a CF platform may let a tenant subscribe to a service offering (e.g., a Software As A Service ("SAAS") application) which is one per landscape. However, multiple software systems may be needed in one landscape to support different isolated environments (e.g., used for different purposes such as testing, production, canary, and development). As a result, a user may subscribe to one SAAS application but only be able to access one or more systems (based on settings specified during a onboarding process). Also note that landscape scoped software should be deployed only once in a separate space. In contrast, system scoped software should be deployed in its own system specific isolated space.

Each system should be in its own CF space so that isolation and easier manageability (such as administrative roles, quotas, etc.) can be achieved for each system. Moreover, each system should only allow access to users or tenants that have been onboarded for that system. Singleton applications (which are single instance per system) should be installed and managed in their own space so that access to the space can be separately managed separately. This also helps manage tenants from a centralized system and, based on settings in the singleton application, access to various other systems may be managed.

In some cases, there may be limitations associated with sharing across spaces to establish trust between landscape software and system specific software. For example, because the CF platform does not support sharing of UAA instance across spaces, it is difficult to establish trust between landscape scoped microservices and system scoped microservices. This limitation may require duplicate installations of all landscape software in the system space (therefore violating the singleton constraint for landscape scoped software).

Another limitation may be associated with a single SAAS application per system. Note that the current CF or UAA architecture has a limitation that a single SAAS application can be linked to only one UAA that can be subscribed to by tenants. Since each system needs to restrict access only to users who are entitled to a particular system, it may be important that each system has access to an UAA (so that it can authorize users as appropriate). Because the CF platform does not support sharing of UAA instance across spaces, if the system violates the singleton constraint of landscape scoped microservices and replicates them in each system (i.e., each system space), this also means that separate UAAs are needed for each system (and each system now has its own provisioning application which also serves as the lading point for a SAAS application). However, since the platform has the limitation that each SAAS application can bind to only one UAA (and now there are 2 UAAs) two SAAS applications need to be registered in the account. This also means that for n systems there would need to be n SAAS applications registered in the platform.

Still another limitation may be associated with upgrading a tenant from one system to another. After a tenant is onboarded on one system (e.g., a trial system), the tenant may later want to upgrade onto a production account. During this upgrade, the tenant would prefer to avoid re-subscribing to a different application (and would prefer to access a production environment by simply setting a flag in the provisioning application). This would also help avoid the need for the tenant to recreate all the roles and authorizations in the UAA for the accounts or reestablish trusts for the Identity Provider ("IDP") in the new system. However because of the is a single SAAS application per system, when there are multiple SAAS applications to be upgraded from one system to another, it would invariably mean that the tenant must subscribe to a new application (and, since it is a subscription to a new UAA, the tenant again needs to recreate and apply all roles and authorizations for all users).

FIG. 1 is a high-level block diagram of a cloud computing environment 100 architecture layout. The computing environment 100 includes a user 110 who subscribes to a CF platform SAAS application 122 in a CF SAAS marketplace 120. The application 122 communicates with a SAAS UAA 134 in a landscape space for singleton applications 130. The user 110 may then transmit information to a provisioning application 132 and an application router 136. The provisioning application 132 may send information to a system onboarding application 144 and the application router 136 may send information to backend microservices 148 (via an end User Interface ("UP") application 142) in a system space for per system microservices 140. Note that the end user UI application 142, the system onboarding application 144, and the backend microservices 148 may communicate with a system UAA 146 as appropriate. Such a layout lets the system maintain singleton applications in one space and based on configuration settings in the provisioning application. A tenant can be allowed access to one or more systems wherein each system has its own set of system specific microservices. As a result, a tenant can be given access to a test system or a production system. Similarly, a tenant can be given access to a system which has enhanced capabilities or is on a specific version (e.g., V1 or V2). However, as shown the be "X" symbols in FIG. 1, some paths are not allowed because they cross space boundaries. Since each space has its own UAA and the UAAs cannot be shared across two spaces, trust cannot be established between the two spaces. This prevents singleton applications running in a different space from communicating with system specific applications running in a separate space.

Figure 2:
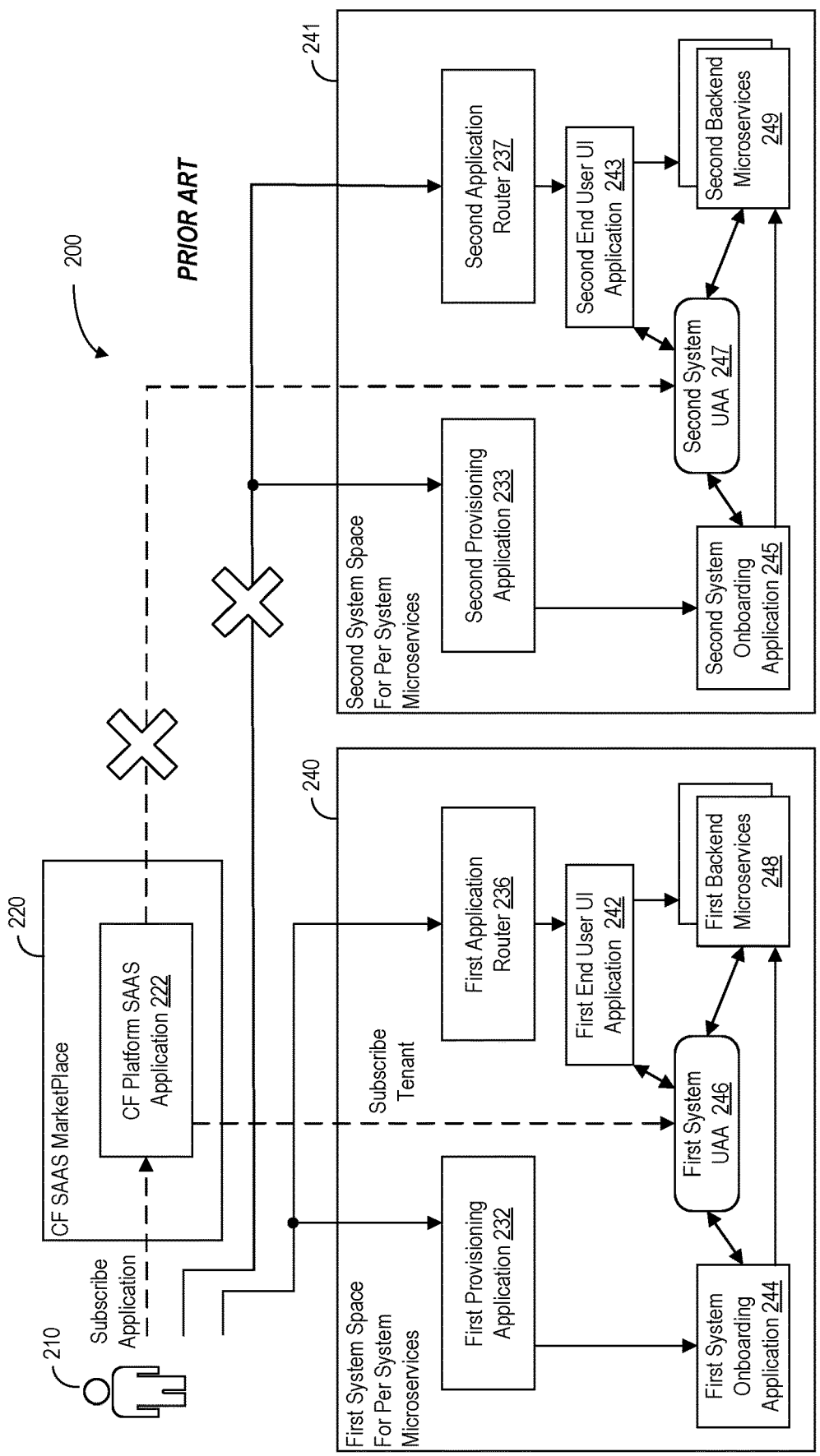
FIG. 2 is another computing environment approach where singleton applications are replicated in each system.

To prevent UAA access across spaces, an architecture may replicate all singletons into each system space. FIG. 2 illustrates another approach where singleton applications are replicated in each system. As before, a computing environment 200 includes a user 210 who subscribes to a CF platform SAAS application 222 in a CF SAAS marketplace 220. The application 222 communicates with a first system SAAS 246 in a first system space for per system microservices 240. The user 210 may then transmit information to a first provisioning application 232 and a first application router 236. The first provisioning application 232 may send information to a first system onboarding application 244, and the first application router 236 may send information to first backend microservices 248 (via a first end user UI application 242) in the system space for per system microservices 240. Note that the first end user UI application 242, the first system onboarding application 244, and the first backend microservices 248 may communicate with the first system UAA 246 as appropriate.

In this approach, a second system space for per system microservices 241 is also provided. The application 222 also communicates with a second system SAAS 247 in the second system space for per system microservices 241. The user 210 may then transmit information to a second provisioning application 233 and a second application router 237. The second provisioning application 233 may send information to a second system onboarding application 245, and the second application router 237 may send information to second backend microservices 249 (via a second end user UI application 243) in the system space for per system microservices 241. Note that the second end user UI application 243, the second system onboarding application 245, and the second backend microservices 249 may communicate with the second system UAA 247 as appropriate.

This computing environment 200 also violates some of the CF limitations previously described (as illustrated by the "X" symbols in FIG. 2). For example, if a tenant subscribes to one SAAS application, the tenant is automatically subscribed to the UAA registered with that SAAS application. However, upon subscription the tenant cannot be made to subscribe to two different UAAs. As a result (since during subscription trust cannot be established between the second system UAA 247 and the tenant), the tenant can only communicate with first system applications but not second system applications.

Figure 3:
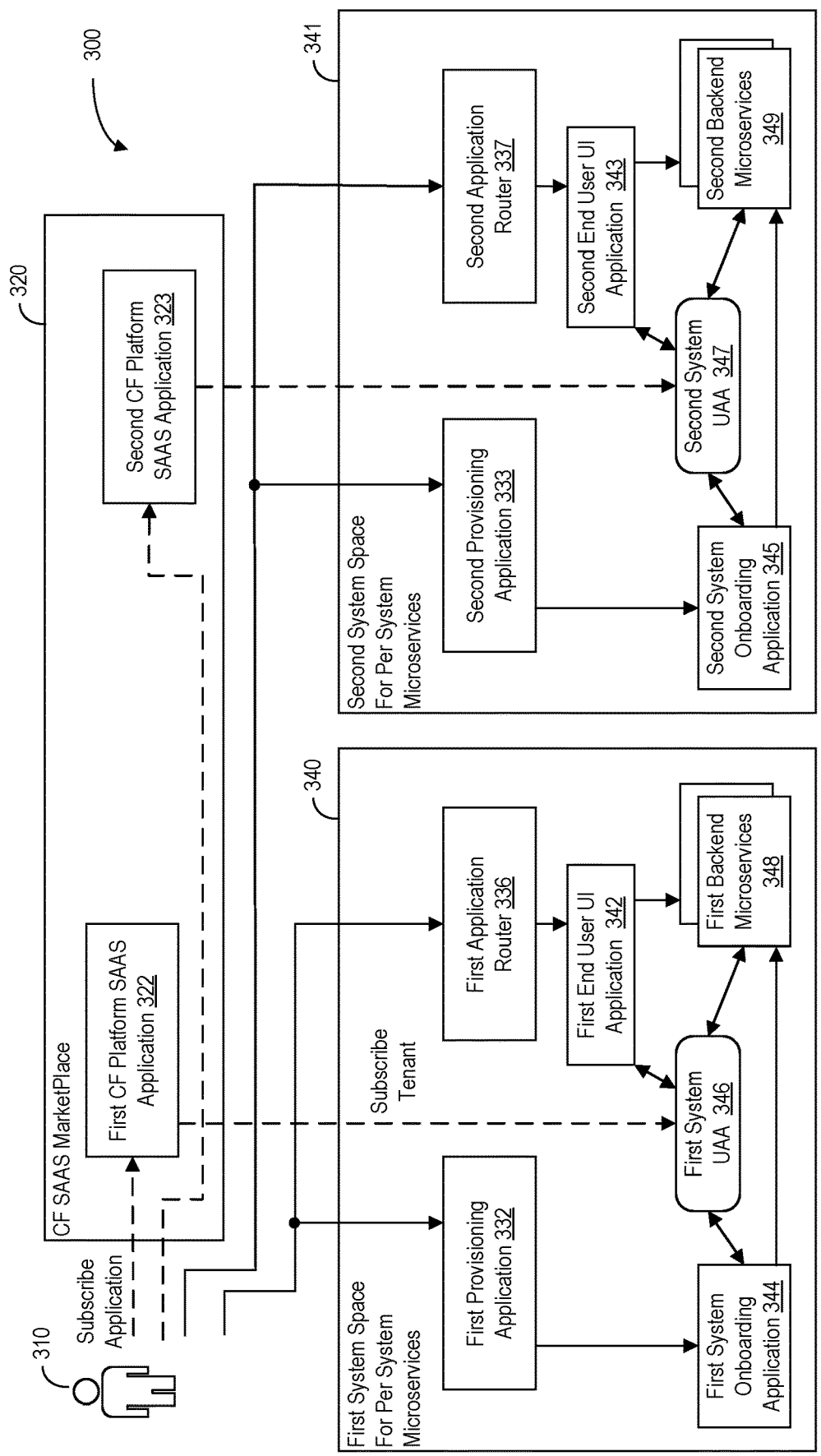
FIG. 3 illustrates a computing environment 300 where an SAAS registry is duplicated in a platform and a new SAAS application is created.

To overcome this problem, an SAAS registry might be duplicated in the platform and a new SAAS application may be created (e.g., a first SAAS application and a second SAAS application). FIG. 3 illustrates a computing environment 300 using such an approach. As before, the computing environment 300 includes a user 310 who subscribes to a first CF platform SAAS application 322 in a CF SAAS marketplace 320. The first application 322 communicates with a first system SAAS 346 in a first system space for per system microservices 340. The user 310 may then transmit information to a first provisioning application 332 and a first application router 336. The first provisioning application 332 may send information to a first system onboarding application 344, and the first application router 336 may send information to first backend microservices 348 (via a first end user UI application 342) in the system space for per system microservices 340. Note that the first end user UI application 342, the first system onboarding application 344, and the first backend microservices 348 may communicate with the first system UAA 346 as appropriate.

In this approach, the user 310 also subscribes to a second CF platform SAAS application 323 that has been created in the CF SAAS marketplace 320 and a second system space for per system microservices 341 is provided. The second application 323 also communicates with a second system SAAS 347 in the second system space for per system microservices 341. The user 310 may then transmit information to a second provisioning application 333 and a second application router 337. The second provisioning application 333 may send information to a second system onboarding application 345, and the second application router 337 may send information to second backend microservices 349 (via a second end user UI application 343) in the system space for per system microservices 341. Note that the second end user UI application 343, the second system onboarding application 345, and the second backend microservices 349 may communicate with the second system UAA 347 as appropriate.

Note that the user 310 now has to explicitly subscribe to both the first SAAS application 322 and the second SAAS application 323 (which might not be desirable). In addition, this approach has a drawback because which system the tenant is subscribed to is now managed by the client but not the service provider. For example, if you would like to share tenants across multiple systems, automatic sharing logic cannot be built into the provisioning applications 332, 333 to choose based on some logic where the tenant is provisioned. If the computing environment 300 only lets a tenant access one system (e.g., trial or production) and not to both systems, then (since the tenant is provisioned by two separate provisioning applications 332, 333 rather than a singleton) it may be difficult to control such restrictions.

Moreover, if the computing environment 300 wants to upgrade a tenant from one system to another (e.g., from the first system to the second system), this would require changing subscription from the first system UAA 346 to the second system UAA 347 which is not possible. As a result, this will have to be an activity driven by the tenant where he or she now must subscribe to the second system UAA 347 and unsubscribe from the first system UAA 346. In addition, the tenant now also must recreate all of the roles and mappings in the second UAA 347 because the previous mappings will be lost. Another problem with the computing environment 300 is that in the case of an upgrade (since each system now has a different application router 336, 337) on migration the application URL will also change. This might not be desirable for the customer who may have already published the previous URLs.

According to some embodiments described herein, UAA access for microservices may be provided across spaces in an efficient and accurate way. Embodiments may overcome the need to share a UAA across the landscape singleton space and the system specific space. The need for the UAA is because when a request from the user is sent to a singleton application and a system specific application both of these applications need a mechanism to identify the authenticity of the user based on a JavaScript Object Notation ("JSON") Web Token ("JWT") token, because the applications run in different spaces and thus require access to the UAA across spaces. To further complicate matters, the system may also want to prevent one user from being able to access all of the systems (or, rather, only let them access on those systems to which they are entitled.

Embodiments may restrict all authentication and authorization of incoming requests to the singleton space using a route proxy agent. Embodiments may also establish a trusted connection between the route proxy agent and the system applications exposing route endpoints (and once such trust is established the system applications can delegate their authentication and authorization functionality to the route proxy agent). In this way, the system is not bound to the UAA as it now knows that no request can come to it without first going through the route proxy agent. Moreover, route service functionality available from CF may be leveraged to ensure that all requests going to system route endpoints are first routed/intercepted through the route proxy agent.

Figure 4:
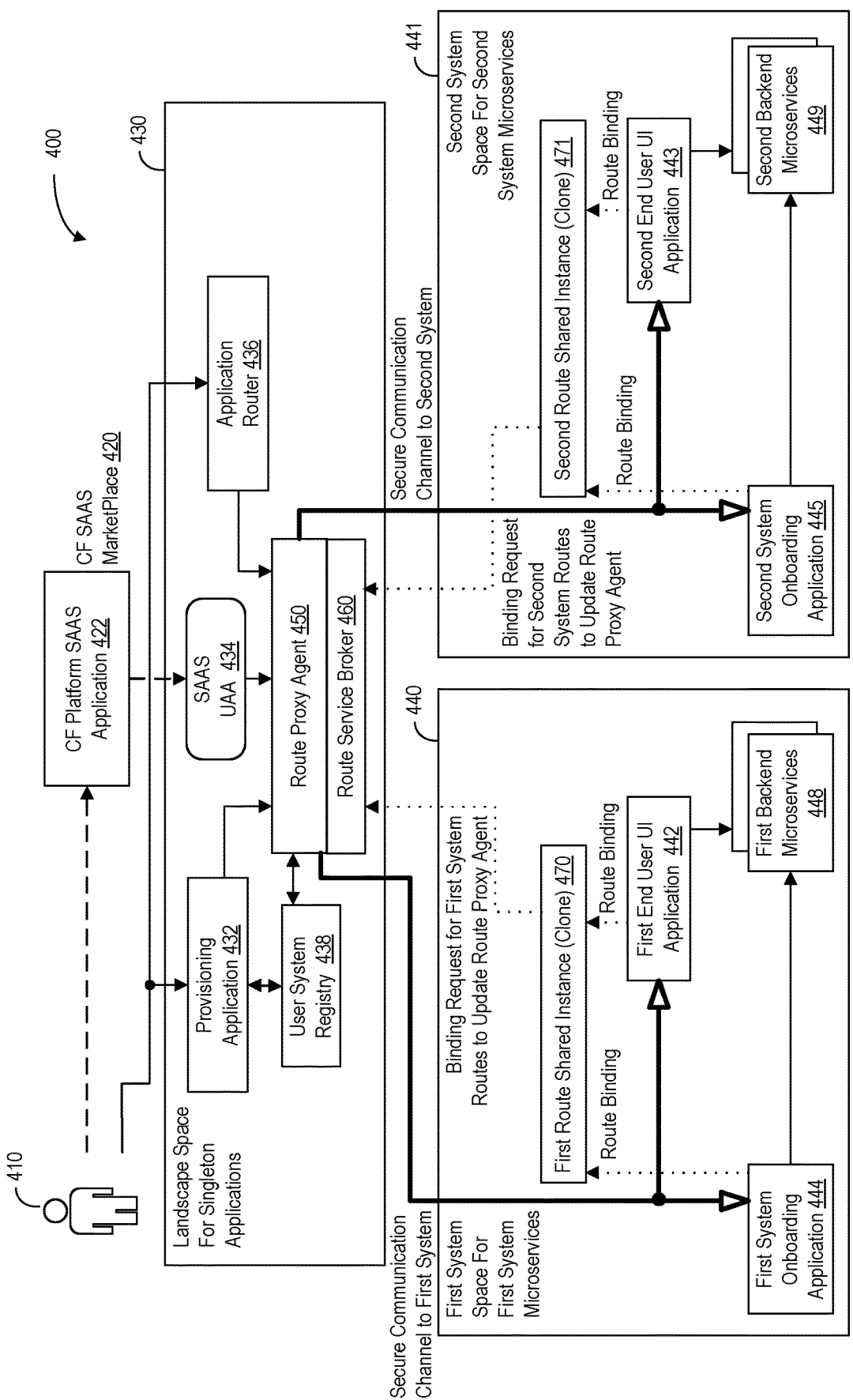
FIG. 4 is a high-level block diagram of a computing environment in accordance with some embodiments.

FIG. 4 is a high-level block diagram of a computing environment 400 in accordance with some embodiments. The computing environment 400 includes a user 410 who subscribes to a CF platform SAAS application 422 in a CF SAAS marketplace 420. The application 422 communicates with a SAAS UAA 434 in a landscape space for singleton applications 430. The user 410 may then transmit information to a provisioning application 432 and an application router 436. The provisioning application 432 may access a user system registry 438 (e.g., to determine where the user 410 is registered).

Both the provisioning application 432 and the application router 436 may communicate with a first system space 440 and a second system space 441 via a route proxy agent 450 and a route service broker 460. For example, the route proxy agent 450 may automatically arrange for the provisioning application 432 to send information to a first system onboarding application 444 and for the application router 436 to send information to first backend microservices 448 (via a first end user UI application 442) in the system space for per system microservices 440. As used herein, the term "automatically" may refer to, for example, actions that can be performed with little or no human intervention. The first system onboarding application 444 and the first end user UI application 442 may transmit route binding to the route service broker 460 via a first route service shared instance clone (clone) 470.

The route proxy agent 450 may also automatically arrange for the provisioning application 432 to send information to a second system onboarding application 445 and for the application router 436 to send information to second backend microservices 449 (via a second end user UI application 443) in the system space for second system microservices 441. The second system onboarding application 445 and the second end user UI application 443 may transmit route binding to the route service broker 460 via a second route service shared instance clone (clone) 471.

According to some embodiments, the route proxy agent 450 may validate JWT tokens in incoming requests. All of the incoming requests that pass through the route proxy agent 450 will include a JWT token that is validated against the SAAS UAA 434. Only requests that have been successfully validated are allowed to pass through to the next step. Requests that are not validate are rejected and an appropriate HTTP response code is returned (e.g., code "403").

The route proxy agent 450 may also validate that the user 410 has access or has subscribed to the SAAS application 422. Since all the users 410 (irrespective of the access to which they are entitled) are now subscribed to the same SAAS UAA 434, all users technically can access any of the systems. However, to restrict access during the onboarding process, the provisioning application 432 may store information in the user system registry 438 about which applications the user 410 can access. When a user request is routed via the route proxy agent 450, the route proxy agent 450 retrieves the user ID from the JWT token, the system ID from the requested route (e.g., the host, the path, the headers and/or a message body) and compares it with the entries in the user system registry 438. If the combination exists, then the user request is allowed to pass through. Otherwise, the request is rejected.

The route service broker 460 may be based on the CF concept called route services and open service broker API specifications. This component allows each user-facing application running in different systems to bind their URLs to an instance of the route service. On binding the routes to a route service instance, the route service broker 460 virtually forces the CF platform to route all requests to the exposed route via the route proxy agent 450. In this way, CF will ensure that any request going to any of the systems exposed URLs (registered with a route service instance) are first forwarded to the route proxy agent 450. It is then up to the route proxy agent 450 to further forward the request to the intended original destination (or elsewhere). By following this approach, applications running within the first or second system spaces 440, 441 know that they can trust any request that is received because the request can only come from the route proxy agent 450. Since the route proxy agent 450 has already done all the validations before forwarding the request, applications running within the systems 440, 441 do not need to further validate the authenticity of the request and/or JWT token. Instead, scope checks in the JWT token may be performed to see if the requester has enough permissions to carry out the operation. This flow avoids the need to share a UAA between the system and the singleton applications, because in this setup all of the authentication and authorization checks are done in the landscape singleton application space 430 before being forwarded to the appropriate system 440, 441.

Figure 5:
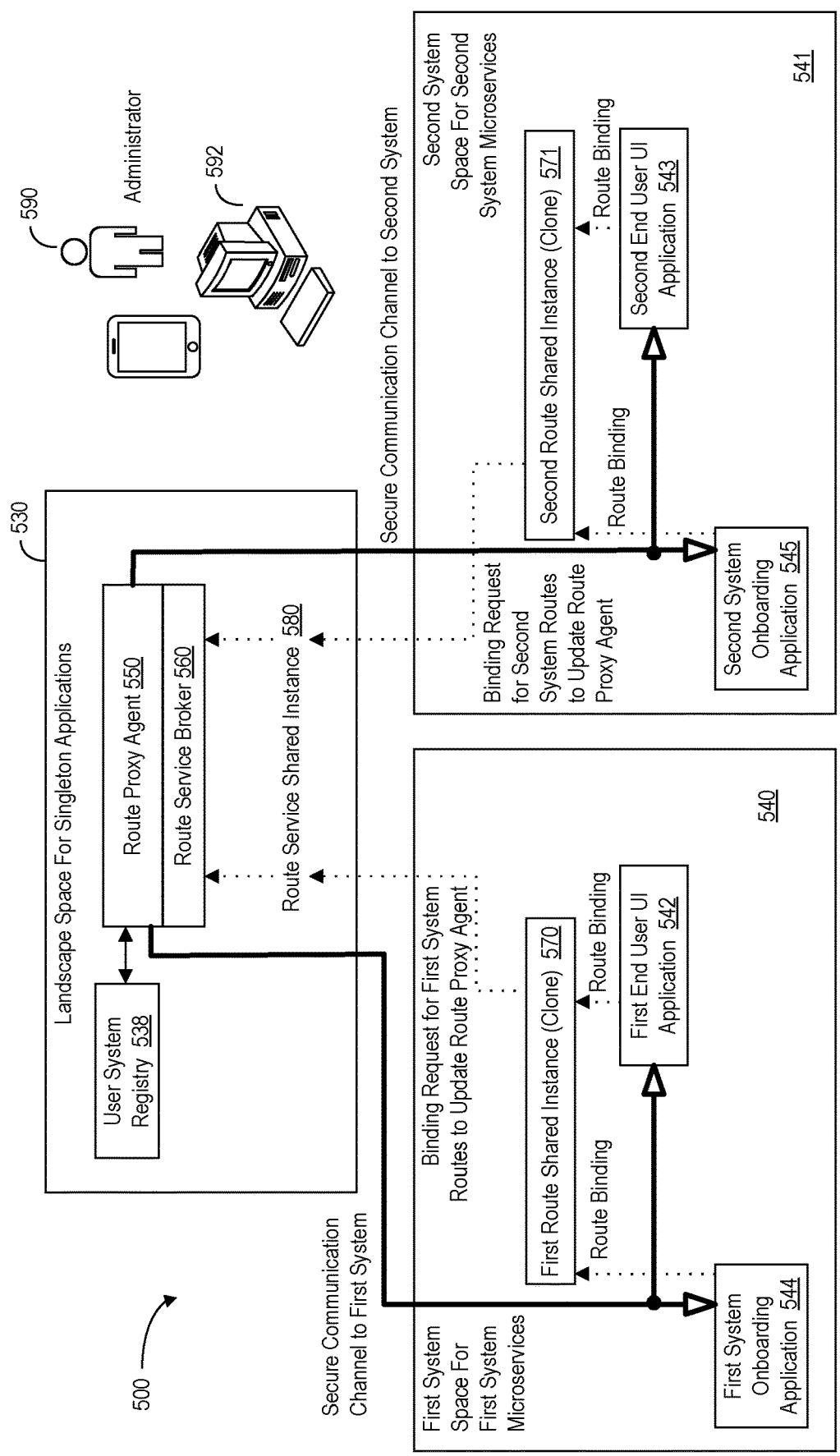
FIG. 5 illustrates computing environment with a route service shared instance according to some embodiments.

According to some embodiments, a route service instance may be provided to let routes be bound as per CF specifications. Moreover, a shared instance may be provided. FIG. 5 is a high-level block diagram of a computing environment 500 in accordance with some embodiments. The computing environment 500 includes a landscape space for singleton applications 530 with a user system registry 538 indicating where users are registered. A provisioning application and an application router may communicate with a first system space 540 and a second system space 541 via a route proxy agent 550 and a route service broker 560. For example, the route proxy agent 550 may arrange for the provisioning application 532 to send information to a first system onboarding application 544 in the system space for first system microservices 540. The first system onboarding application 544 and a first end user UI application 542 may transmit route binding to the route service broker 560 via a first route service shared instance clone (clone) 570. The route proxy agent 550 may also arrange for the provisioning application to send information to a second system onboarding application 545 in the system space for second system microservices 541. The second system onboarding application 545 and a second end user UI application 543 may transmit route binding to the route service broker 560 via a second route service shared instance clone (clone) 571. An administrator 590 may configure the system via one or more remote administrator devices 592 (e.g., a Personal Computer ("PC"), tablet, or smartphone) to view information about and/or manage operational information in accordance with any of the embodiments described herein. In some cases, an interactive graphical user interface display may let the administrator 590 define and/or adjust certain parameters (e.g., to landscapes) and/or provide or receive automatically generated recommendations or results from the computing environment 500.

Note that routes from multiple systems need to be routed via the route proxy agent 550 running in the singleton space 530. A route service shared instance 580 may be created in the singleton space 530 and the administrator 590 can then share this instance 580 to the different spaces 540, 541 in which the systems are running. The cloned instances 570, 571 may comprise virtual representations of the instance which is shared. Since CF does not allow binding routes to route services running in a different space, these cloned instances 570, 571 may be created in each system space 540, 541. When a route is bound, CF may be instructed that all requests coming to this route should first be redirected to the route proxy agent 550.

In other embodiments, instead of creating one shared route service instance 580 and multiple clones 570, 571, the computing environment 500 instead registers the route service broker 560 in every system space 540, 541. Such an approach may allow for the creation of a route service instance in each of the system spaces 540, 541 (and the rest of the information flow may remain the same).

As used herein, devices, including those associated with the computing environment 500 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The route proxy agent 550 may store information into and/or retrieve information from various data stores, which may be locally stored or reside remote from the route proxy agent 550. Although a single route proxy agent 550 is shown in FIG. 5, any number of such devices may be included. Moreover, various devices described herein might be combined according to embodiments of the present invention. For example, in some embodiments, the route proxy agent 550 and route service broker 560 might comprise a single apparatus. The computing environment 500 functions may be performed by a constellation of networked apparatuses, such as in a distributed processing or cloud-based architecture.

Figure 6:
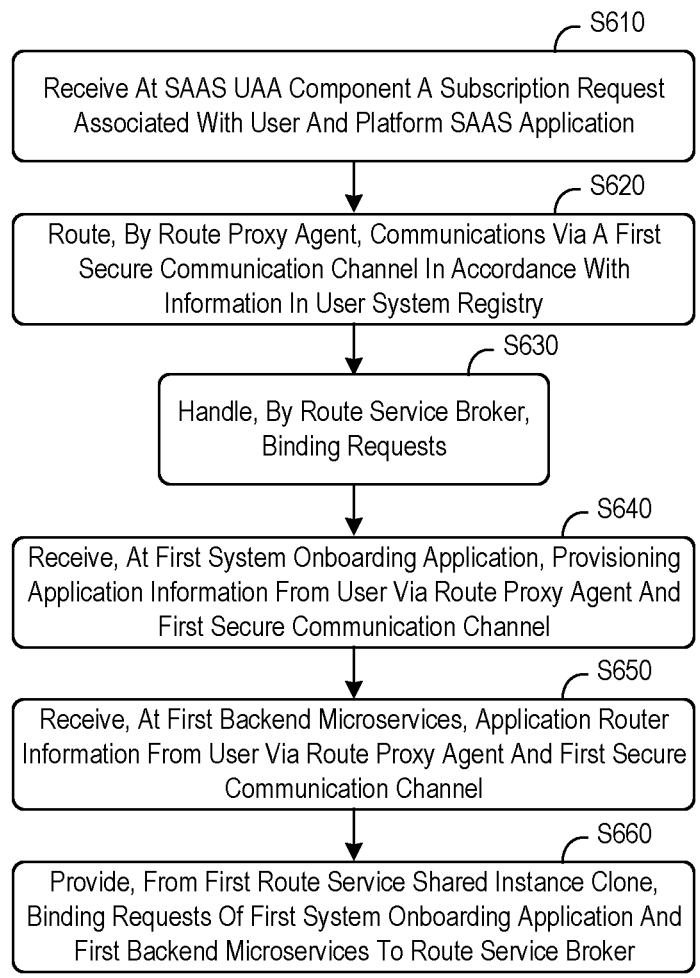
FIG. 6 is a method according to some embodiments.

FIG. 6 is a method that might performed by some or all of the elements of the computing environments 400, 500 described with respect to FIGS. 4 and 5. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S610, a SAAS UAA component of a landscape space for singleton applications may receive a subscription request associated with a user and a platform SAAS application. At S620, a route proxy agent of the landscape space may route communications via a first secure communication channel in accordance with information in a user system registry (that indicates spaces in which the user is registered). At S630, a route service broker of the landscape space may handle binding requests. At S640 a first system onboarding application of a first system space for first system microservices may receive provisioning application information from the user via the route proxy agent and the first secure communication channel. At S650, first backend microservices of the first system space for first system microservices may receive application router information from the user via the route proxy agent and the first secure communication channel, At S660, a first route service shared instance clone of the first system space for first system microservices may provide binding requests of the first system onboarding application and the first backend microservices to the route service broker.

Figure 7:
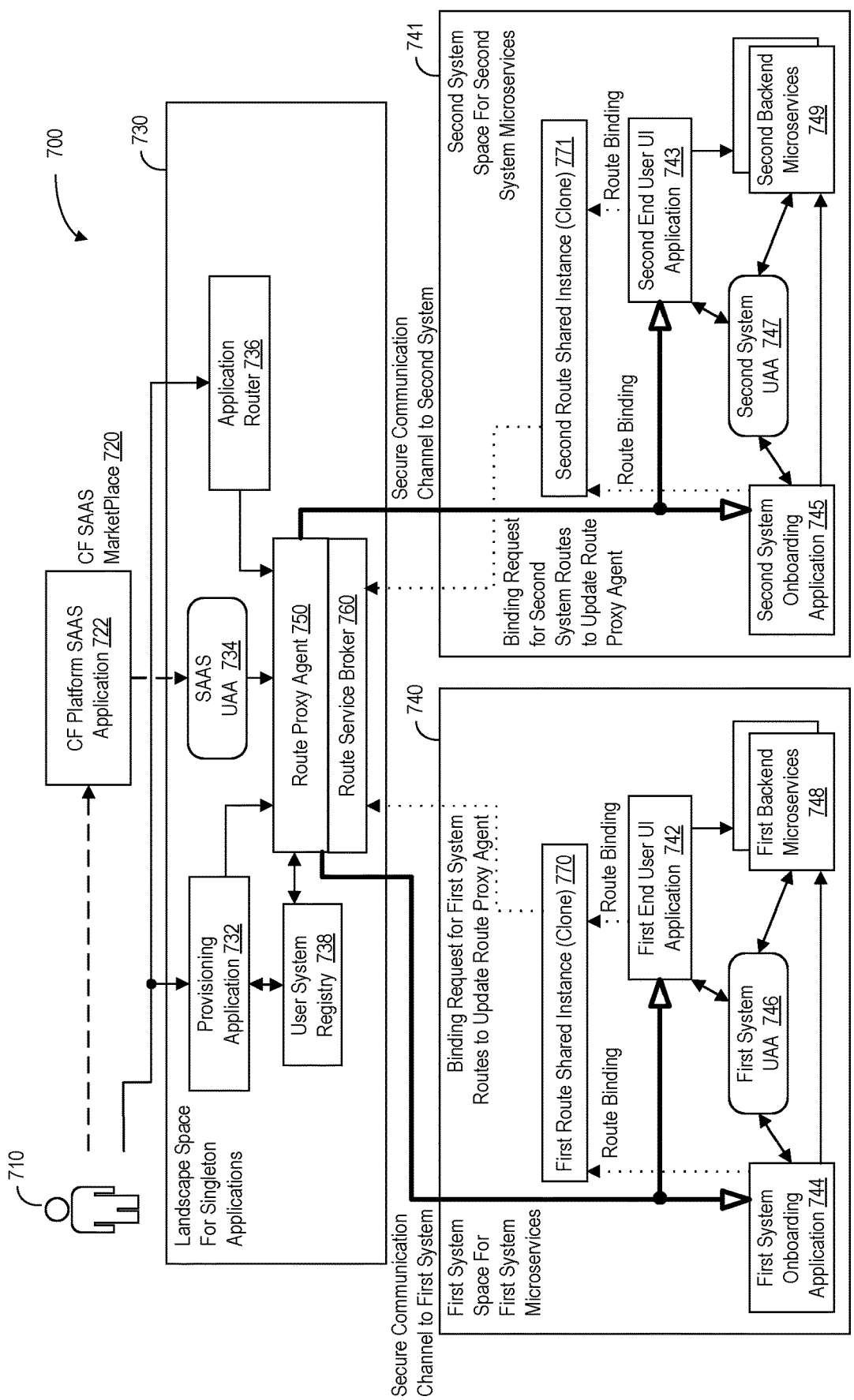
FIG. 7 is a more detailed block diagram of a computing environment in accordance with some embodiments.

FIG. 7 is a more detailed block diagram of a computing environment 700 in accordance with some embodiments. The computing environment 700 includes a user 710 who subscribes to a CF platform SAAS application 722 in a CF SAAS marketplace 720. The application 722 communicates with a SAAS UAA 734 in a landscape space for singleton applications 730. The user 710 may then transmit information to a provisioning application 732 and an application router 736. The provisioning application 732 may access a user system registry 738 (e.g., to determine where the user 710 is registered).

Both the provisioning application 732 and the application router 736 may communicate with a first system space 740 and a second system space 741 via a route proxy agent 750 and a route service broker 760. For example, the route proxy agent 750 may arrange for the provisioning application 732 to send information to a first system onboarding application 744 and for the application router 736 to send information to first backend microservices 748 (via a first end user UI application 742) in the system space for per system microservices 740. Note that the first end user UI application 742, the first system onboarding application 744, and the first backend microservices 748 may communicate with the first system UAA 746 as appropriate. The first system onboarding application 744 and the first end user UI application 742 may transmit route binding to the route service broker 760 via a first route service shared instance clone (clone) 770.

The route proxy agent 750 may also arrange for the provisioning application 732 to send information to a second system onboarding application 745 and for the application router 736 to send information to second backend microservices 749 (via a second end user UI application 743) in the system space for second system microservices 741. Note that the second end user UI application 743, the second system onboarding application 745, and the second backend microservices 749 may communicate with the second system UAA 747 as appropriate. The second system onboarding application 745 and the second end user UI application 743 may transmit route binding to the route service broker 760 via a second route service shared instance clone (clone) 771.

Note that the system-specific UAAs 746, 747 might only be used for internal system communication and have no role to play in requests coming in from outside the system. These components 746, 747 can be omitted and are illustrated to depict a possible system setup. Also note that components, including the route proxy agent 750, the route service broker 760, the application router 736, and the provisioning application 732, are merely software creations. As a result, during implementation these could be combined in different ways and/or as different applications (e.g., to prevent network hops).

Figure 8:
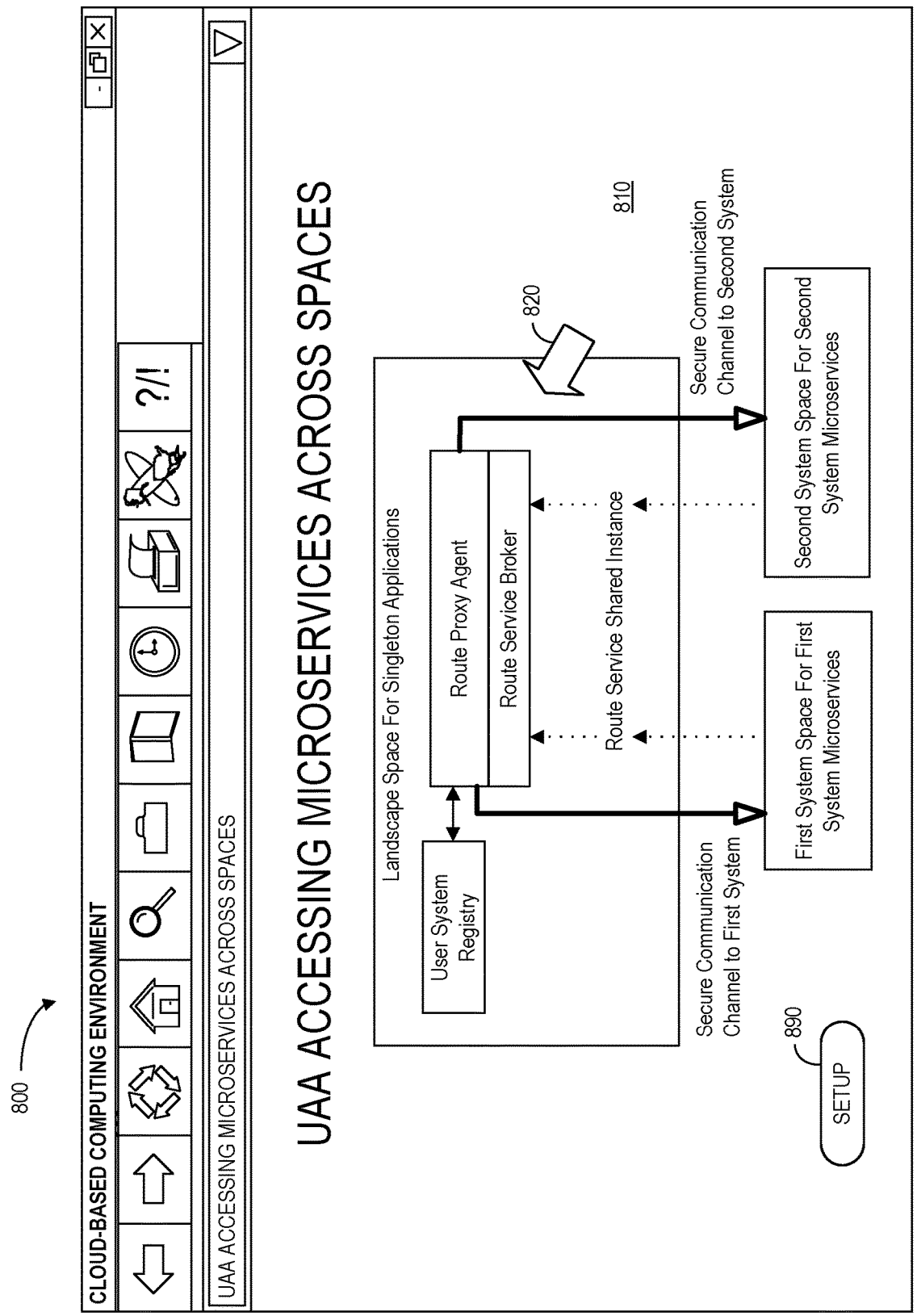
FIG. 8 is a human machine interface display according to some embodiments.

FIG. 8 is a human machine interface display 800 associated with UAA accessing microservices across spaces in accordance with some embodiments. The display 800 includes a graphical representation 810 of elements of a cloud-based computing environment. Selection of an element (e.g., via a touch-screen or computer pointer 820) may result in display of a pop-up window containing various options (e.g., to add landscapes, assign routing information, etc.). The display 800 may also include a user-selectable "Setup" icon 890 (e.g., to configure parameters for CF platform SAAS applications).

Figure 9:
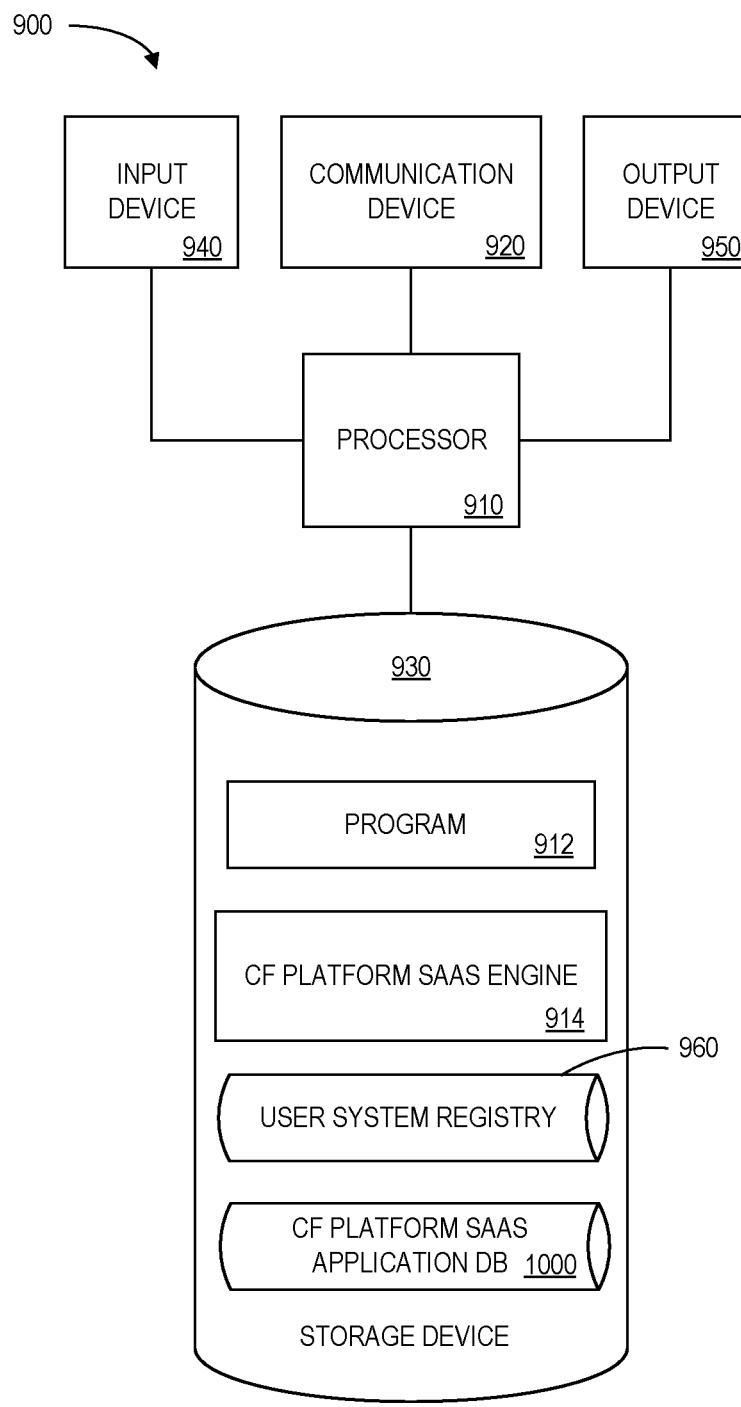
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the computing environment 400 of FIG. 4

(and/or any other architecture described herein). The platform 900 comprises a processor 910, such as one or more commercially available Central Processing Units ("CPUs") in the form of one-chip microprocessors, coupled to a communication device 960 configured to communicate via a communication network (not shown in FIG. 9). The communication device 960 may be used to communicate, for example, with one or more remote user platforms, cloud resource providers, etc. The platform 900 further includes an input device 940 (e.g., a computer mouse and/or keyboard to input landscape or application information) and/an output device 950 (e.g., a computer monitor to render a display, transmit recommendations, and/or create data center reports). According to some embodiments, a mobile device and/or PC may be used to exchange information with the platform 900.

The processor 910 also communicates with a storage device 930. The storage device 930 can be implemented as a single database or the different components of the storage device 930 can be distributed using multiple databases (that is, different deployment information storage options are possible). The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or CF platform SAAS engine 914 for controlling the processor 910. The processor 910 performs instructions of the programs 912, 914, and thereby operates in accordance with any of the embodiments described herein. For example, the processor 910 may arrange a landscape space for singleton application, a first system space for first system microservices, a second system space for second system microservices, etc.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores a user system registry 960 and a CF platform SAAS application database 1000. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Figure 10:
FIG. 10 illustrates a web assembly database in accordance with some embodiments.

Referring to FIG. 10, a table is shown that represents the CF platform SAAS application database 1000 that may be stored at the platform 900 according to some embodiments. The table may include, for example, entries define applications that may be utilized by tenants. The table may also define fields 1002, 1004, 1006, 1008, for each of the entries. The fields 1002, 1004, 1006, 1008 may, according to some embodiments, specify: a CF platform SAAS application identifier 1002, a landscape for singleton application 1004, landscapes for system microservices 1006, and a status 1008. The CF platform SAAS application database 1000 may be created and updated, for example, when new applications are added, additional versions are introduced such as test, production, etc.

The CF platform SAAS application identifier 1002 might be a unique alphanumeric label or link that is associated with an application that might be executed by a tenant. The landscape for singleton application 1004 may indicate a space where a route proxy agent and/or route service broker might be provided in accordance with any of the embodiments described herein. The landscapes for system microservices 1006 might indicate multiple spaces that each execute microservices for users associated with the tenant. The status 1008 might indicate that the application is running, is currently being deployed, etc.

Thus, embodiments may provide UAA access for microservices across spaces in an efficient and accurate way. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
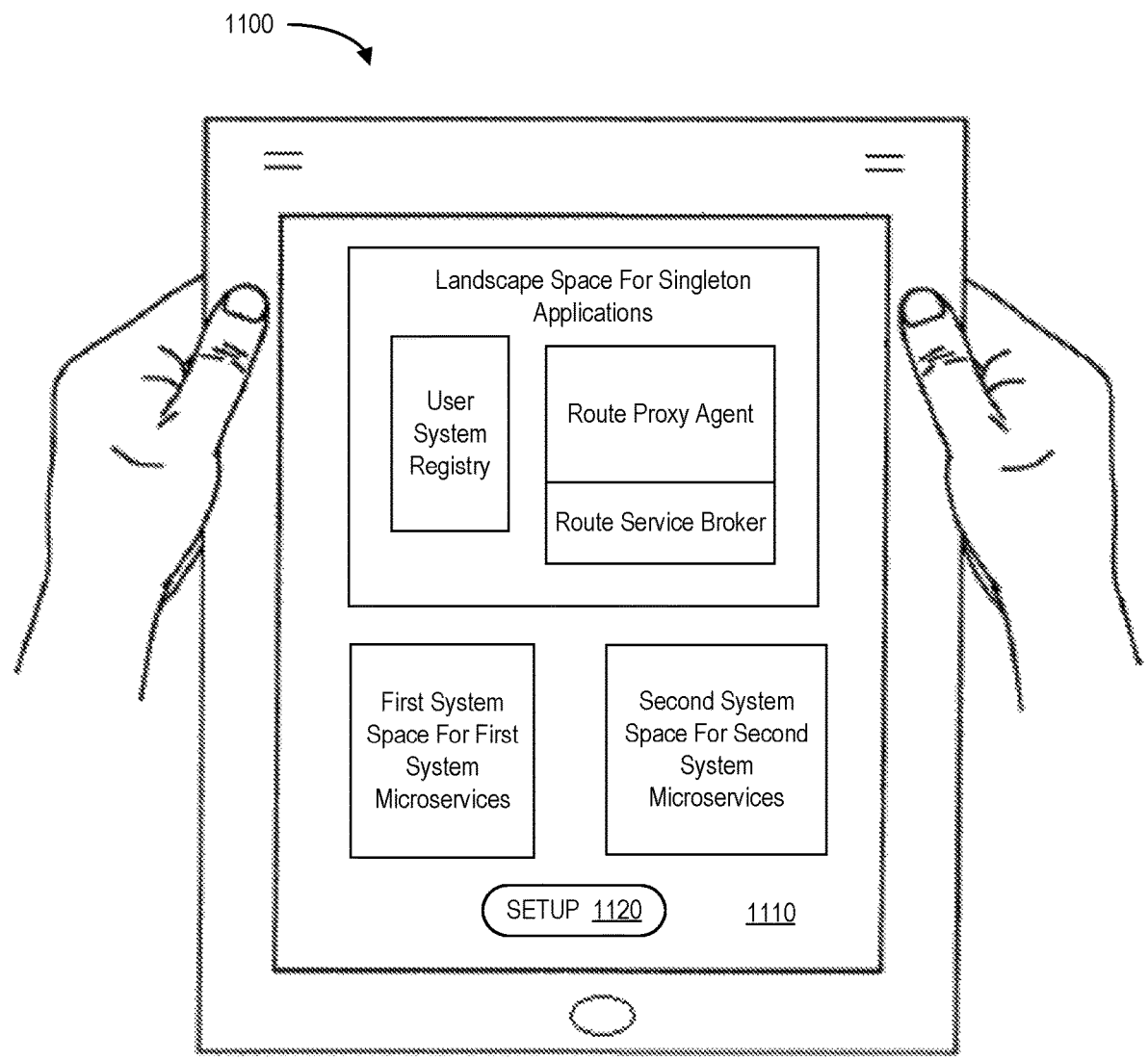
FIG. 11 illustrates a tablet computer in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of database applications and services, any of the embodiments described herein could be applied to other types of applications and services. In addition, the displays shown herein are provided only as examples, and any other type of user interface could be implemented. For example, FIG. 11 shows a tablet computer 1100 rendering a UAA accessing microservices across spaces display 1110. The display 1110 may, according to some embodiments, be used to view more detailed elements about components of the computing environment (e.g., when a graphical element is selected via a touchscreen) or to configure operation of the system (e.g., to provide routing information and/or applications for the system via a "Setup" icon 1120).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computing system associated with cloud computing, comprising:
   a landscape space for singleton applications, including:
      a Software As a Service ("SAAS") User Authorization and Authentication ("UAA") platform with a computer processor and a computer memory, coupled to the computer processor, storing instructions that, when executed by the computer processor, receive a subscribe application request associated with a user and a platform SAAS application,
   a user system registry indicating spaces in which the user is registered, a route proxy agent to route communications via a first secure communication channel in accordance with registry information in the user system registry, and a route service broker to handle first binding requests; and a first system space for first system microservices, including:

a first system onboarding application to receive provisioning application information from the user via the route proxy agent and the first secure communication channel, first backend microservices to receive application router information from the user via the route proxy agent and the first secure communication channel, and a first route service shared instance clone to provide the first binding requests of the first system onboarding application and the first backend microservices to the route service broker.

2. The computing system of claim 1, wherein the user is associated with a tenant of a multi-tenant cloud computing environment.

3. The computing system of claim 2, wherein the user transmits the subscribe application request to the platform SAAS application and the platform SAAS application transmits a subscribe tenant request to the SAAS UAA platform.

4. The computing system of claim 1, wherein a route binding is sent from the first backend microservices to the first route service shared instance clone via a first end User Interface ("UI") application in the first system space for the first system microservices.

5. The computing system of claim 1, wherein the route proxy agent validates JavaScript Object Notation ("JSON") Web Token ("JWT") information associated with the subscribe application request received from the user.

6. The computing system of claim 5, wherein the route proxy agent compares a user identifier of the JWT information and a system identifier from a requested route with the registry information in the user system registry.

7. The computing system of claim 6, wherein the system identifier is based on at least one of the following in the requested route:
(i) a host, (ii) a path, (iii) a header, and (iv) a message body.

8. The computing system of claim 1, further comprising:
a second system space for second system microservices, including:

a second system onboarding application to receive the provisioning application information from the user via the route proxy agent and a second secure communication channel, second backend microservices to receive the application router information from the user via the route proxy agent and the second secure communication channel, and a second route service shared instance clone to provide second binding requests of the second system onboarding application and the second backend microservices to the route service broker.

9. The computing system of claim 1, wherein a second binding request is provided via the first route service shared instance clone in the first system space and a route service shared instance in the landscape space for the singleton applications.

10. The computing system of claim 1, wherein the cloud computing environment is a Cloud Foundry ("CF") computing environment.

11. The computing system of claim 10, wherein the route service broker utilizes CF route services and open service broker Application Programming Interface ("API") specifications.

12. A computer-implemented method associated with a cloud computing environment, comprising:

receiving, at a Software As a Service ("SAAS") User Authorization and Authentication ("UAA") platform of a landscape space for singleton applications, a subscribe application request associated with a user and a platform SAAS application;

routing, by a route proxy agent of the landscape space for the singleton applications, communications via a first secure communication channel in accordance with registry information in a user system registry, wherein the user system registry indicates spaces in which the user is registered;

handling, by a route service broker of the landscape space for the singleton applications, first binding requests;

receiving, at a first system onboarding application of a first system space for first system microservices, provisioning application information from the user via the route proxy agent and the first secure communication channel;

receiving, at first backend microservices of the first system space for first system microservices, application router information from the user via the route proxy agent and the first secure communication channel; and providing, from a first route service shared instance clone of the first system space for the first system microservices, the first binding requests of the first system onboarding application and the first backend microservices to the route service broker.

13. The method of claim 12, wherein the user is associated with a tenant of a multitenant cloud computing environment.

14. The method of claim 13, wherein the user transmits the subscribe application request to the platform SAAS application and the platform SAAS application transmits a subscribe tenant request to the SAAS UAA platform.

15. The method of claim 12, wherein a route binding is sent from the first backend microservices to the first route service shared instance clone via a first end User Interface ("UI") application in the first system space for the first system microservices.

16. The method of claim 12, wherein the route proxy agent validates JavaScript Object Notation ("JSON") Web Token ("JWT") information associated with the subscribe application request received from the user.

17. The method of claim 16, wherein the route proxy agent compares a user identifier of the JWT information and a system identifier from a requested route with the registry information in the user system registry.

18. The method of claim 17, wherein the system identifier is based on at least one of the following in the requested route: (i) a host, (ii) a path, (iii) a header, and (iv) a message body.

19. A non-transitory, computer readable medium having executable instructions stored therein, the medium comprising:

instruction to receive, at a Software As a Service ("SAAS") User Authorization and Authentication ("UAA") platform of a landscape space for singleton applications, a subscribe application request associated with a user and a platform SAAS application;

instruction to route, by a route proxy agent of the landscape space for the singleton applications, communications via a first secure communication channel in accordance with information in a user system registry, wherein the user system registry indicates spaces in which the user is registered;

instruction to handle, by a route service broker of the landscape space for the singleton applications, first binding requests;

instruction to receive, at a first system onboarding application of a first system space for first system microservices, provisioning application information from the user via the route proxy agent and the first secure communication channel;

instruction to receive, at first backend microservices of the first system space for the first system microservices, application router information from the user via the route proxy agent and the first secure communication channel; and instruction to provide, from a first route service shared instance clone of the first system space for the first system microservices, the first binding requests of the first system on boarding application and the first backend microservices to the route service broker.

20. The medium of claim 19, wherein a second binding request is provided via a route service shared instance clone in the first system space and a route service shared instance in the landscape space for the singleton applications.

21. The medium of claim 19, wherein the SAAS UAA is associated with a Cloud Foundry ("CF") computing environment.

22. The medium of claim 21, wherein the route service broker utilizes CF route services and open service broker Application Programming Interface ("API") specifications.

* * * * *